Figure 1:
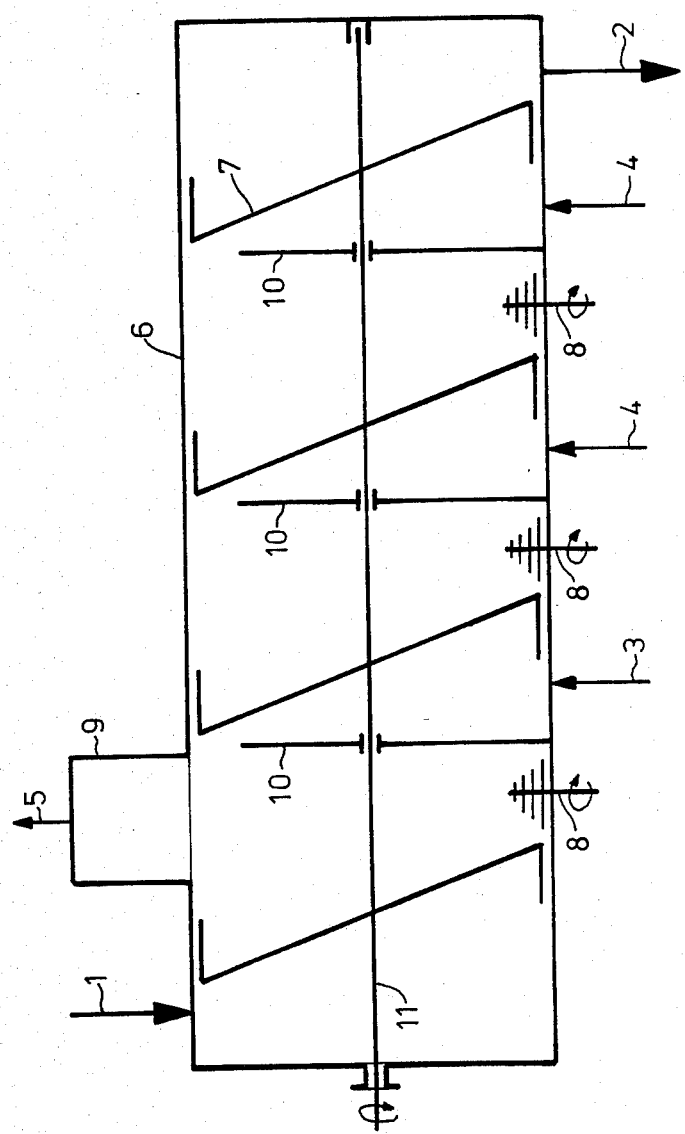

United States Patent [19]
Bernert et al.

[11] Patent Number: 4,507,473
[45] Date of Patent: Mar. 26, 1985

[54] PROCESS FOR THE CONTINUOUS GRANULATION OF CARBOXYMETHYL CELLULOSE

[75] Inventors: Claus-Rüdiger Bernert, Walsrode; Hans-Gert Kirchner, Fallingbostel; Reinhard Näder, Walsrode, all of Fed. Rep. of Germany

[73] Assignee: Wolff Walsrode Aktiengesellschaft, Walsrode, Fed. Rep. of Germany

[21] Appl. No.: 587,737

[22] Filed: Mar. 8, 1984

[30] Foreign Application Priority Data

Mar. 9, 1983 [DE] Fed. Rep. of Germany ....... 3308420

[51] Int. Cl.³ .............................................. C08B 11/20
[52] U.S. Cl. ........................................ 536/86; 536/98
[58] Field of Search ....................... 241/28; 536/86, 98

[56] References Cited

U.S. PATENT DOCUMENTS 2,607,772 8/1952 Rigby .................................... 536/86
3,088,943 5/1963 Cordrey et al. ....................... 536/98
4,236,959 12/1980 Reinhall ................................ 241/28

Primary Examiner—Ronald W. Griffin
Attorney, Agent, or Firm—Sprung, Horn, Kramer & Woods

[57] ABSTRACT

A continuous process for the granulation of alcohol- and water-moist carboxymethyl cellulose (CM) produced by standard methods, wherein the CMC still moist with adhering aqueous alcohol is continuously introduced into a stirring unit, of which the length-to-diameter ratio is greater than 1 and of which the radial stirring elements are mounted on a shaft extending longitudinally in the stirring unit, and is taken up by the stirring elements, which rotate at a peripheral speed of at least 2 m/sec, being percussively size-reduced, and at the same time is brought into contact with steam flowing in countercurrent, and after a residence time of at least 1 minute, is discharged from the stirring unit and dried in the usual way.

3 Claims, 1 Drawing Figure

PROCESS FOR THE CONTINUOUS GRANULATION OF CARBOXYMETHYL CELLULOSE

This invention relates to a process for the continuous granulation of alcohol- and water-moist carboxymethyl cellulose (CMC) wherein the purified and optionally squeeze-dried carboxymethyl cellulose obtained by known methods is continuously delivered to a fluidized bed and, while being size-reduced by high-speed stirring elements is flown through by steam.

In conventional processes for the production of cellulose ethers, particularly carboxymethyl cellulose, the cellulose ether is purified after alkalization and etherification with aqueous alcohol, preferably aqueous ethanol, propanol or methanol. The CMC cannot be worked up into a free-flowing granulate by drying simply the alcohol-containing moist material. Instead, the alcohol has to be quantitatively removed before the product can be granulated and dried subsequently. In order to remove the alcohol adhering to the carboxymethyl cellulose, the squeeze-dried carboxymethyl cellulose is subjected first to a preliminary drying, preferably in the form of contact drying, flash drying, vortex tube drying or vacuum drying, each of which has certain disadvantages. If the drying is carried out batchwise, it is time-consuming and requires apparatus with large volumes. In addition, it is not possible according to the above-mentioned drying processes to prevent evaporating a too large amount of water which is required in processing the granulation of the product. The result is an unnecessary consumption of energy. One particular disadvantage lies in the fact that the CMC freed from the alcohol has a absorbent cotton-like, loose consistency, the further processing of which involves considerable difficulties.

Accordingly, to obtain the required apparent density and adequate pourability of the CMC, the product has to be granulated separately in the precense of water after removal of the alcohol. This step can be carried out batchwise in large mixers which is both time-consuming and energy-consuming because the granulation can only be achieved after a relatively long residence time because the uptake of the necessary water is slow. After the product has been granulated adequately, i.e. compacted to an apparent density of from 300 to 800 g/l and preferably from 450 to 650 g/l, that the product can be dried properly. In this connection, it has been found to be a disadvantage that the apparent density and sieve spectrum, i.e. the amount of dust of the product, cannot be exactly controlled. Since, in this procedure, these parameters can only be controlled, if at all, through the quantity of water introduced before granulation, adjustment of water introduced before granulation, adjustment of the water content to obtain a high apparent density and a low powder content of the end product generally results in overmoistening of the CMC and hence in complicated definitive drying of the product.

With the process according to the present invention, it is possible to free the purified, squeezedried carboxymethyl cellulose from the adhering alcohol continuously and to carry out the required granulation of the CMC in a single process step.

Accordingly, the present invention relates to a continuous process for the granulation of squeeze-dried alcohol- and water-moist carboxymethyl cellulose produced by standard methods wherein the squeeze-dried CMC still moist with adhering aqueous alcohol is introduced into a stirring unit continuously, of which the length-to-diameter ratio is greater than 1, preferably in the range of from 3:1 to 10:1 and more preferably in the range of from 4:1 to 8:1 and of which the radial stirring elements are mounted on a shaft extending longitudinally in the stirring unit, is taken up and by sized reduced stirring elements, which rotate at a peripheral speed of at least 2 m/sec. and preferably 3–5 m/sec., and simultaneously is brought into contact with steam flowing in countercurrent and, after a residence time of at least 1 minute, preferably at least 5 minutes and, more preferably, from 10 to 30 minutes, is discharged from the stirring unit and dried in the usual way.

The squeeze-dried carboxymethyl cellulose obtained after purification normally contains from 20 to 80% by weight of the aqueous alcohol used for purification, the alcohol generally making up 50%. It is possible by the inventive process to reduce this alcohol content to less than 0.1%, and subsequently to recover the alcohol from the steam. In order to remove the alcohol completely from the CMC, preferably from 0.1 to 1 kg of steam per kg of CMC has to be fed in.

In the process according to the invention, it is possible, by adjusting the quantity of steam and/or the residence time in the stirring unit and/or the stirring speed, to control the required apparent density of the dried material to within a range of from 300 to 800 g/l and preferably from 450 to 650 g/l, the required particle size of from 0.1 to 1 mm and the dust content preferably to at most 20%.

The inventive process according may be carried out in any known stirring unit of which the length-to-diameter ratio is greater than 1 and which is provided with stirring elements mounted on a horizontal shaft.

It has proved to be particularly advantageous if, in addition to the main stirrer, additional high-speed stirring elements, such as for example rotating beater bars, beater blades or beater pins, are arranged perpendicularly to the main stirrer and if, in addition, the product stream is guided over fixed or adjustable weirs in order to produce a plug-like flow through the stirring unit and to control the residence time of the CMC in the stirring unit. The steam guided in countercurrent is introduced into the stirring unit at at least one point. In order to obtain the water content of at least 25% and preferably from 30 to 42% required for granulation, it may be necessary to add water in the last third of the stirring unit.

The process according to the invention may be carried out with particular advantage in the stirring unit shown in FIG. 1. As shown in that drawing, the alcohol- and water-moist carboxymethyl cellulose is introduced into the stirring unit (1), taken up and size-reduced by the radially rotating stirrer (7) mounted on a horizontal shaft (11), size-reduction being accelerated by the beater bars (cutter heads 8) rotating at very high speed and the residence time being extended by the passage over the weirs (10). The steam is introduced in countercurrent through nozzles (3) and (4) and removed together with the alcohol (5) driven out through the dome (9). The granulated CMC is discharged at the end of the stirring unit (6) by standard discharge means (2).

The carboxymethyl cellulose produced by the process according to the invention may be used in all the usual fields and preferably as auxiliaries in oil-well fluids, as a constituent of cosmetics, for foods or for treating paper and leather.

In the following examples the percentages are by weight.

EXAMPLE 1

The apparatus used is a 4000-liter-capacity mixer of the type shown in FIG. 1 with a length-to-diameter ratio of 6.7. The mixer is equipped with a horizontal shaft with radially arranged mixing elements and with three 4-stage cutter heads. A vertically adjustable overflow weir is arranged in front of the mixer outlet. Either steam or water may be introduced into the apparatus at three points in the vicinity of the cutter heads. A dome is situated at the front end of the mixer for removing the vapours.

A 1450 kg/h stream of 68% of low-viscosity carboxymethyl cellulose, 20% of water and 12% of ethanol is continuously delivered to the mixer. 0.3 kg—divided into equal parts—of steam per kg of CMC is introduced at the three cutter heads. For a mixer speed of 75 $min^{-1}$, the position of the weir is adjusted in such a way that the product has an average residence time of 10 minutes in the mixer. The cutter heads rotate at 1500 $min^{-1}$.

The product issuing from the mixer contains less than 0.1% of ethanol and 31% of water. The dried carboxymethyl cellulose has a powder density of 650 g/l and a dust content (particles smaller than 0.2 mm in diameter) of less than 10%.

EXAMPLE 2

A 1550 kg/h stream of 66% of medium-viscosity carboxymethyl cellulose, 21% of water and 13% of ethanol is delivered to the same apparatus as described in Example 1. A total of 0.4 kg of steam per kg of CMC is introduced at the three cutter mills. For a mixer speed of 90 $min^{-1}$, the position of the weir is adjusted in such a way that the product has an average residence time of 25 mins. in the mixer. the beater mills run at 3000 $min^{-1}$.

The product issuing from the mixer contains less than 0.1% of ethanol and 36% of water. The dried carboxymethyl cellulose has a powder density of 570 g/l and a dust content of less than 15%.

EXAMPLE 3

A 1600 kg/h stream of 64% of high-viscosity carboxymethyl cellulose, 23% of water and 13% of ethanol is delivered to the same apparatus as described in Example 1. 0.45 kg of steam per kg of CMC is introduced at two of the three cutter mills and 0.2 kg of water per kg of CMC at the third cutter mill. For a mixer speed of 100 $min^{-1}$, the position of the weir is adjusted in such a way that the product remains in the mixer for about 30 minutes. The beater mills run at 3000 $min^{-1}$.

The product issuing from the mixer contains less than 0.1% of ethanol and 41% of water. The dried carboxymethyl cellulose has a powder density of 480 g/l and a dust content of less than 20%.

We claim:

1. A continuous process for the granulation of alcohol and water-moist carboxymethyl cellulose (CMC), which comprises continuously introducing CMC still moist with adhering aqueous alcohol into an elongated stirring unit, of which the length-to-diameter ratio is greater than 1 and in which radial stirring elements are mounted on a shaft extending longitudinally, the CMC being taken up and size reduced by the stirring elements, rotating the stirring elements at a peripheral speed of at least 2 m/sec., simultaneously passing steam countercurrent to the direction of advance of the CMC; and, after a residence time of at least 1 minute, discharging the CMC from the stirring unit and drying the CMC.

2. A process as claimed in claim 1, wherein the stirring elements rotate at a peripheral speed of 3 to 5 m/sec.

3. A process as claimed in claim 1, wherein the residence time is at least 5 minutes.

* * * * *